Feb. 16, 1926.                                             1,573,033
F. L. BISHOP
METHOD AND APPARATUS FOR ANNEALING AND COOLING SHEET GLASS
Filed Sept. 4, 1924                    2 Sheets-Sheet 1
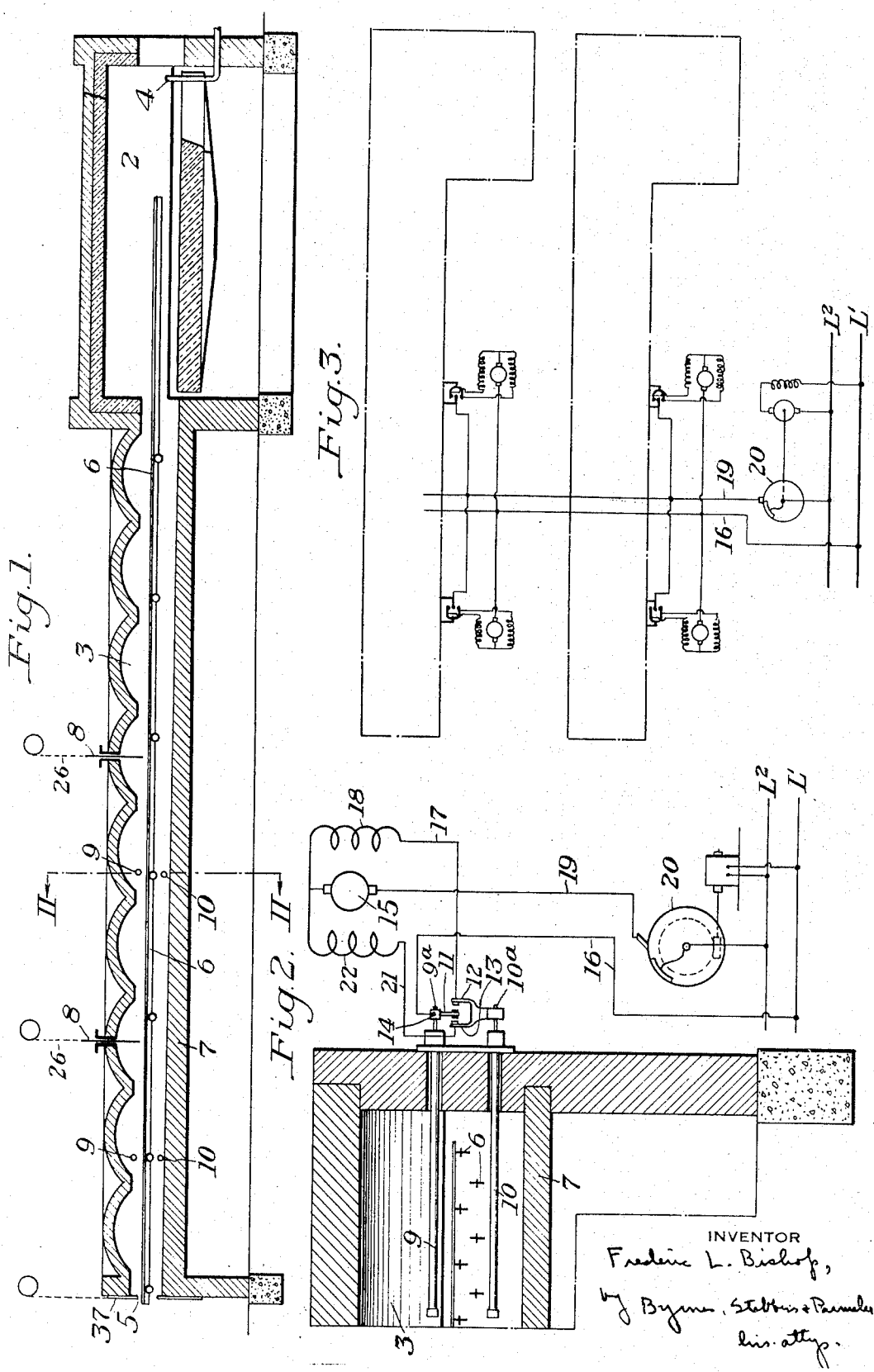

Feb. 16, 1926.  
F. L. BISHOP  
1,573,033  
METHOD AND APPARATUS FOR ANNEALING AND COOLING SHEET GLASS  
Filed Sept. 4, 1924  2 Sheets-Sheet 2
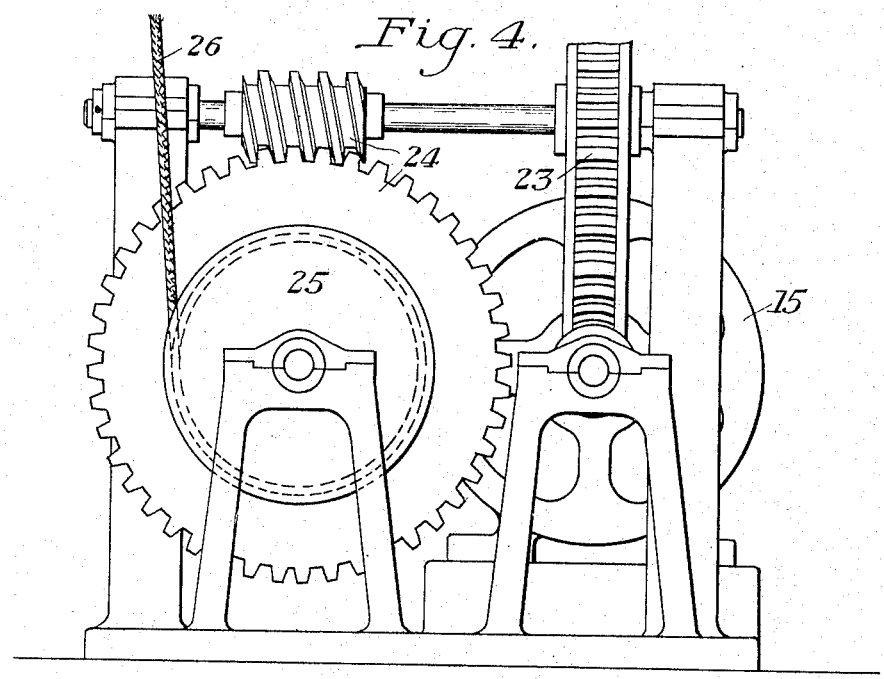
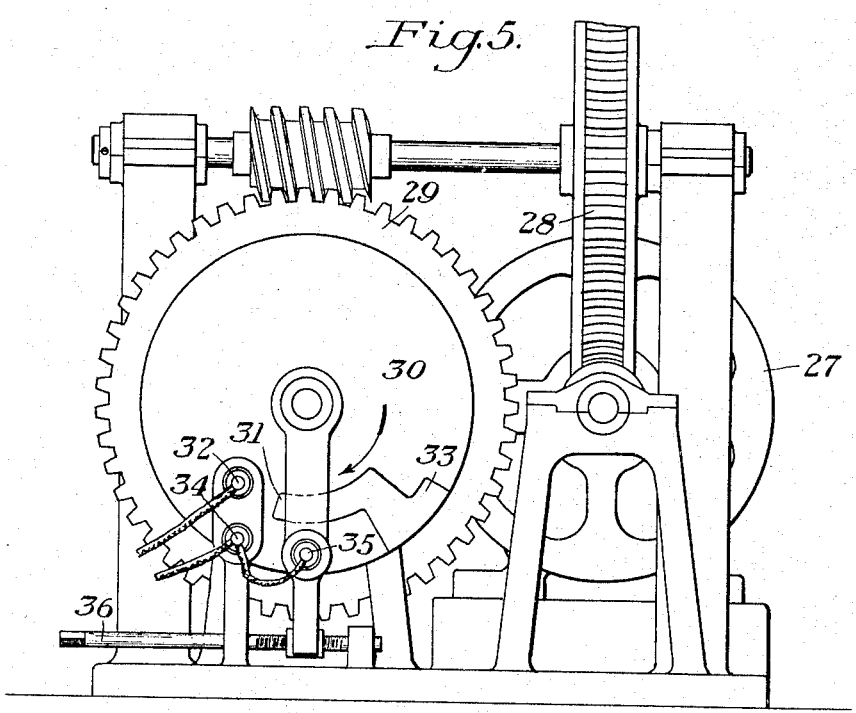
INVENTOR  
Frederic L. Bishop.  
by Byrnes, Stebbin + Parmelee  
his attys.

Patented Feb. 16, 1926.

1,573,033

UNITED STATES PATENT OFFICE.

FREDERIC L. BISHOP, OF PITTSBURGH, PENNSYLVANIA, ASSIGNOR TO WINDOW GLASS MACHINE COMPANY, OF PITTSBURGH, PENNSYLVANIA, A CORPORATION OF NEW JERSEY.

METHOD AND APPARATUS FOR ANNEALING AND COOLING SHEET GLASS.

Application filed September 4, 1924. Serial No. 735,789.

*To all whom it may concern:*

Be it known that I, FREDERIC L. BISHOP, a citizen of the United States, residing at Pittsburgh, in the county of Allegheny and State of Pennsylvania, have invented a new and useful Improvement in Methods and Apparatus for Annealing and Cooling Sheet Glass, of which the following is a full, clear, and exact description.

This invention relates to the annealing and cooling of sheet glass, and particularly to a temperature control whereby the working of an annealing and cooling apparatus for sheet glass may be more accurately regulated than heretofore with a consequent improvement in the quality and quantity of glass which may be produced therefrom.

In the copending application of John Hartzell, Serial No. 693,249, filed Feb. 16, 1924, there is shown a leer for use in connection with the annealing and cooling of sheet glass made by the cylinder process, which leer is adapted for the passage of gaseous fluid in streams above and below the glass, together with means for varying the relative cooling effect of the two streams. This apparatus is particularly useful for the production of flat unwarped glass, since the two streams may be so regulated that the heat losses from the two faces of the glass are equalized and the tendency to warp is thus eliminated. The present invention is shown as applied to one form of leer shown in the Hartzell application, although it may be readily applied to various other forms of apparatus. Furthermore, the invention is not limited to the use of a leer employed in connection with the cylinder process, as it may be equally well applied to leers used in other processes of manufacturing sheet glass. For example, in processes where the glass is drawn in a continuous sheet, the invention may be readily applied. In those cases where the glass travels horizontally, apparatus similar to that shown in the drawings may be used. Where the glass is drawn in a vertical direction, regulating means may be provided on one or both sides of the glass sheet.

I provide for adjusting the relative cooling effect of the gaseous streams to maintain a predetermined relative temperature condition between points in the leer. These points are preferably both above and below the glass, so that the relative cooling effect of the two streams may be automatically regulated to insure the production of flat glass.

The heat capacity of a leer is generally so great that the effect of an adjustment is generally not entirely apparent until there has elapsed a period of time depending on the construction and mass of the leer. This being the case, it is desirable to limit in some manner the action of the adjusting devices to prevent overtravel and consequent hunting of the apparatus. I preferably provide for rendering the temperature controlled means operative for short periods of time at spaced intervals. In this manner an adjustment may be made during the period when the regulating means is operative, but regardless of temperature conditions, no further adjustment can occur until the time interval has elapsed, during which period the leer has had an opportunity to change to the new conditions imposed by the adjusting means and hunting is thus reduced or entirely eliminated.

In the accompanying drawings, which show the present preferred embodiment of the invention:

Figure 1 is a vertical section through a flattening oven and connected leer embodying my invention;

Figure 2 is a partial vertical section on the line II—II of Figure 1, showing thermostats for measuring the temperature of the gaseous streams above and below the glass and showing in schematic manner the electric wiring thereof;

Figure 3 is a wiring diagram showing the control as applied to a battery of leers;

Figure 4 is a side elevation of one form of apparatus for varying the relative cooling effect of the gaseous streams in accordance with the relative temperature thereof, as indicated by the thermostats shown in Figure 2; and Figure 5 is a side elevation of a contacting apparatus employed in connection with my invention for rendering the apparatus of Figure 4 operative only at set intervals.

In the illustrated embodiment of the invention, there is shown a flattening oven 2 having a horizontally extending leer tunnel 3 connected therewith. The oven is heated in any desired manner, as by gas burners 4, and the heat from the oven passes through the leer 3 toward the delivery opening 5. Leer rods 6 of any suitable construction are placed in the leer 3 for supporting the glass as it travels therethrough and when the leer is in operation these rods are effective for supporting the glass sheets in such manner as to form a substantially continuous partition through the leer tunnel so that hot gases from the flattening oven 2 are divided into two streams, one above and one below the glass sheets.

It will be understood that the term "flattening oven" as used herein refers to the oven as a whole and is intended to include not only that portion of the apparatus where the glass is actually flattened, but also the so-called dummy oven, cooling oven and piling oven, as will be well understood by those skilled in the art.

The leer 3 is preferably provided with a floor 7 which slopes upwardly toward the delivery end 5 in order to provide a leer tunnel of generally diminishing cross section and thus compensate for the reduced volume of the gases as they drop in temperature. It will be understood, however, that any other form of leer tunnel may be employed in connection with my invention. The advantages of the sloping bottom are particularly set forth in the application of Lawrence A. Gessner, Serial No. 672,530, filed November 3, 1923. The sloping bottom tends to maintain the velocity of the gases traveling through the leer, thereby preventing the ingress of cold air from the delivery end 5 and preventing the displacement of warm gases to the space above the glass by such cold air. The sloping bottom is advantageous in connection with my invention, since it minimizes the amount of control required to operate the apparatus commercially.

As shown in the above mentioned Hartzell application, the relative cooling effect of the gaseous streams may be varied by providing one or more dampers 8 along the leer tunnel 3 which dampers are effective for diverting a portion of the heated gases from one of the gaseous streams to the other. By the present invention, these dampers are automatically controlled in accordance with the relative temperatures of the two streams so as to automatically adjust their position from time to time and further insure a flat unwarped product.

A short distance beyond each damper 8 I provide a pair of thermostats 9 and 10, the thermostat 9 being above the level of the glass sheets and the thermostat 10 therebelow. These thermostats project through the wall of the leer tunnel and are provided with projecting movable elements $9^a$ and $10^a$. The movable element $9^a$ is provided with a contactor 11 which normally lies between a pair of contacts 12 and 13 carried by the movable element $10^a$. The position of the contactor 11 may be adjusted on the movable element $9^a$ by means of a set-screw 14 and it is positioned by experiment so that it lies substantially midway between the contacts 12 and 13 when the leer is operated satisfactorily.

So long as the relative temperature of the two streams is maintained, the glass will continue to come out of the leer in an unwarped condition and the purpose of the thermostats 9 and 10 is to operate a motor 15 in such manner as to adjust the position of the corresponding damper 8 and restore the relative temperatures of the two streams.

The motor 15 is preferably of the split field type drawing current from lines $L^1$ and $L^2$ and, as shown in Figure 2, it will operate in one direction or the other, depending on whether the contactor 11 bears against the contact 12 or the contact 13. If the upper stream becomes relatively hotter, current flows from the line $L^1$ through a wire 16, the contactor 11, the contact 12 and wire 17 and the field 18, thence through the armature of the motor 15 and back to the line $L^2$ through a wire 19. The contact device indicated generally by the reference character 20 is placed in the circuit and its purpose is to open and close the circuit at definite time intervals as hereinafter described. The operation of the motor 15 with the field 18 in circuit is effective for lowering the damper 8 and thus choking off the upper stream, thereby restoring the relative cooling effect of the two streams. If the upper stream becomes relatively cooler, the contactor 11 presses against the contact 13 and current flows from the wire 16 through a wire 21 and a field 22, thence through the armature of the motor 15 and back to the line $L^2$. This circuit is effective for operating the motor 15 in the opposite direction and raising the damper 8, thus increasing the temperature of the upper stream as compared with the lower and again restoring the conditions to normal. In the event that both the upper and the lower streams both increase or decrease in temperature but without any change in their relative temperature, the movable elements $9^a$ or $10^a$ move in equal amounts and the contactor 11 does not touch either the contact 12 or the contact 13, thus maintaining the motor 15 at rest.

The motor 15 operates through worm gearing 23 and 24 to rotate a cable drum 25 having one or more supporting cables 26 wound thereon. The cable or cables are connected with the damper 8 and serve to raise or lower it, depending on the direction of rotation of the motor 15.

It will be apparent that without the interposition in the circuit of some such means as the timing device 20 the apparatus would have a tendency to hunt since the motor 15 would in all probability either move the damper all the way up or all the way down before the full effect of any movement was felt in the operation of the leer. The provision of the time element 20, however, cures this by closing the circuit for only a few seconds at stated time intervals. As shown particularly in Figure 5, the apparatus consists of a motor 27 operating through worm gears 28 and 29 to rotate a contacting arc 30 at a relatively low rate of speed. The arc 30 is provided with a portion 31 which makes connection with a stationary brush 32. It is further provided with a portion 33 adapted to make connection with a stationary brush 34 and a movable brush 35. The arc is rotated in the direction of the arrow as shown in Figure 5, and the circuit through the time element is completed when the portion 31 bears against the brush 32 and the portion 33 reaches the brush 35. The circuit is maintained closed during the period that it takes the arc to rotate from under the contacts 32, 34 and 35.

It will be seen that the parts are so proportioned that the portion 33 will be under the brush 34 before it passes away from the brush 35 so that the brushes 34 and 35 are in effect a single brush. However, their relative position may be changed by operating a threaded shaft 36 and the period during which the circuit is closed may be thus varied. If for example, the brushes 34 and 35 are moved closer together, the period of contact is shortened, whereas if they are spread apart the circuit is closed for a longer period and the motor 15 may operate over this longer period. It will thus be seen that regardless of the relative position of the contactor 11 and the contacts 12 and 13, the motor 15 can only operate for short periods at spaced intervals as determined by the time element 20.

If the relative effect of the two streams on their thermostats 9 and 10 is such as tends toward the rotation of the motor 15, the motor will be operated for a short period and result in a slight movement of the corresponding damper after which the motor will be cut out of operation by the time element 20 to give the leer a chance to adjust itself to the new conditions. If at the time the circuit is again completed by the time element 20 the tendency is toward a further movement of the damper, the motor 15 will again be operated to move the damper a short distance. This is continued until the desired adjustment is secured.

Figure 3 shows a wiring diagram for a battery of ovens. As shown therein, a single timing device 20 may be utilized for the entire battery without affecting the control of any of the ovens.

While in the illustrated embodiment of the invention the leer tunnel 3 has been shown with two dampers applied thereto, obviously any number of dampers may be employed as desired. Furthermore, the damper 37 may be applied to the leer at the delivery opening 5 and adjusted in the same manner as the dampers 8. The control of the relative cooling effect of the two streams by means of dampers will be found highly effective and desirable because of its simplicity. If, however, it is desired to use other means, such for example as coolers, either above or below the glass sheets, such coolers may be provided and their operation regulated by suitably connecting the motors 15.

I thus provide a simple and effective means for adjusting the relative cooling effect of the gaseous streams to maintain a predetermined relative temperature condition between a plurality of points in the leer. The relative temperature at these points is thus maintained regularly by the apparatus and without any experimenting on the part of the operator. By this achievement of uniform conditions at all times, the flattening and annealing operation may be more easily controlled than heretofore. The invention is applicable not only to the described process, but also to other processes of making window glass, and obviously, may be readily applied to leers for plate glass and the like. While I have illustrated a preferred form of my invention, it will be understood that it is not limited thereto but may be otherwise embodied within the scope of the following claims.

I claim—

1. In the method of annealing and cooling sheet glass, the steps consisting in passing sheet glass through a leer, passing gaseous fluid through the leer in streams above and below the glass, and adjusting the relative cooling effect of the streams to maintain a predetermined relative temperature condition between a plurality of points in the leer, substantially as described.

2. In the method of annealing and cooling sheet glass, the steps consisting in passing sheet glass through a leer, passing gaseous fluid through the leer in streams above and below the glass, and adjusting the relative cooling effect of the stream to maintain a predetermined relative temperature condition between a plurality of points above and below the glass in the leer, substantially as described.

3. In the method of annealing and cooling sheet glass, the steps consisting in passing sheet glass through a leer, passing gaseous fluid through the leer in streams above and below the glass, and adjusting the relative cooling effect of the streams to maintain a predetermined relative temperature condition between a point above the glass and a point therebelow, substantially as described.

4. In the method of annealing and cooling sheet glass, the steps consisting in passing sheet glass through a leer, passing gaseous fluid through the leer in streams above and below the glass, and adjusting the relative cooling effect of the streams in a step-by-step manner to maintain a predetermined relative temperature condition between a plurality of points in the leer, substantially as described.

5. In the method of annealing and cooling sheet glass, the steps consisting in passing sheet glass through a leer, passing gaseous fluid through the leer in streams above and below the glass, adjusting the relative cooling effect of the streams in a manner tending toward maintaining a predetermined relative temperature condition between a plurality of points in the leer, maintaining such adjustment over a period of time to permit the leer to adjust itself to the altered condition and continuing the adjustment of the relative cooling effect of the streams at spaced time intervals until the predetermined relative temperature condition has been reached, substantially as described.

6. In the method of annealing and cooling sheet glass, the steps consisting in passing sheet glass through a leer, passing gaseous fluid through the leer in streams above and below the glass, adjusting the relative cooling effect of the streams in a manner tending toward maintaining a predetermined relative temperature condition between a plurality of points in the leer, maintaining such adjustment over a period of time to permit the leer to adjust itself to the altered condition and continuing the adjustment of the relative cooling effect of the streams at spaced time intervals until the predetermined relative temperature condition has been reached, and diverting a portion of the gaseous fluid from one stream to vary the relative cooling effect of the streams and maintain a predetermined relative temperature condition between a plurality of points in the leer, substantially as described.

7. Apparatus for annealing and cooling sheet glass, including a leer, means for passing glass therethrough, means for introducing gaseous streams above and below the glass, and thermostatic means for effecting an adjustment in the cooling effect thereof to maintain a predetermined relative temperature condition between such streams, substantially as described.

8. Apparatus for annealing and cooling sheet glass, including a horizontally extending leer tunnel, means for passing sheet glass therethrough, means for introducing gaseous streams above and below the glass, means for adjusting the relative cooling effect of the streams and a plurality of means at different points in the leer adapted to effect the operation of the last mentioned means for maintaining a predetermined relative temperature condition between such points, substantially as described.

9. Apparatus for annealing and cooling sheet glass, including a horizontally extending leer, means for passing sheet glass therethrough, means for introducing gaseous streams above and below the glass, means for adjusting the relative cooling effect of the streams, temperature responsive means above the glass, temperature responsive means below the glass, and means controlled thereby for effecting the operation of the adjusting means to maintain a predetermined relative temperature condition between the two temperature responsive means, substantially as described.

10. Apparatus for annealing and cooling sheet glass, including a horizontally extending leer tunnel, means for passing glass therethrough, means for introducing gaseous streams above and below the glass, means for adjusting the relative cooling effect of the streams, means located at a plurality of points in the leer and effective for controlling the operation of the last mentioned means to maintain a predetermined relative temperature condition between such points, and means for effecting such regulation in a step-by-step manner, substantially as described.

11. Apparatus for annealing and cooling sheet glass, including a horizontally extending leer tunnel, means for passing glass therethrough, means for introducing gaseous streams above and below the glass, means for adjusting the relative cooling effect of the streams, means located at a plurality of points in the leer and effective for controlling the operation of the last mentioned means to maintain a predetermined relative temperature condition between such points, and means for rendering the adjusting means effective only at spaced time intervals, substantially as described.

12. Apparatus for annealing and cooling sheet glass, including a plurality of leer tunnels, means for passing glass therethrough, means for introducing gaseous streams above and below the glass, means for adjusting the relative cooling effect of the streams in each leer, means placed at a plurality of points in each leer and effective for controlling the adjusting means to maintain a predetermined relative temperature condition between such points, and a single means for controlling the adjusting means of each leer and effective for operating all of such means in a step-by-step manner, substantially as described.

13. In the method of annealing and cooling sheet glass, the steps consisting in passing sheet glass through a leer, passing gaseous fluid through the leer in streams above and below the glass, and automatically adjusting the relative cooling effect of the streams to maintain a predetermined relative temperature condition between a plurality of points in the leer, substantially as described.

In testimony whereof I have hereunto set my hand.

FREDERIC L. BISHOP.